(12) United States Patent
Cho et al.

(10) Patent No.: US 11,349,178 B2
(45) Date of Patent: May 31, 2022

(54) BATTERY PACK WITH SEALED AIR GAP BETWEEN CELLS

(71) Applicant: SAMSUNG SDI CO., LTD., Yongin-si (KR)

(72) Inventors: Kyungho Cho, Yongin-si (KR); Yoongil Kim, Yongin-si (KR); Junyoung Kim, Yongin-si (KR); Minkyun Mok, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 348 days.

(21) Appl. No.: 16/514,399

(22) Filed: Jul. 17, 2019

(65) Prior Publication Data

US 2020/0035975 A1 Jan. 30, 2020

(30) Foreign Application Priority Data

Jul. 25, 2018 (KR) ........................ 10-2018-0086762

(51) Int. Cl.
*H01M 50/20* (2021.01)
*H01M 50/463* (2021.01)

(52) U.S. Cl.
CPC ......... *H01M 50/463* (2021.01); *H01M 50/20* (2021.01); *H01M 2220/20* (2013.01)

(58) Field of Classification Search
None
See application file for complete search history.

(56) References Cited

U.S. PATENT DOCUMENTS

| 8,765,285 | B2 | 7/2014 | Kim | |
| 2008/0160395 | A1* | 7/2008 | Okada | B60L 50/64 |
| | | | | 429/99 |
| 2008/0292950 | A1 | 11/2008 | Maeda et al. | |
| 2017/0098811 | A1* | 4/2017 | Kotik | H01M 50/20 |

FOREIGN PATENT DOCUMENTS

| JP | 2012-033464 | 2/2012 |
| JP | 5449695 | 1/2014 |
| JP | 5558283 | 6/2014 |
| KR | 10-1182958 | 9/2012 |

* cited by examiner

*Primary Examiner* — Lucas J. O'Donnell
(74) *Attorney, Agent, or Firm* — Lee IP Law, P.C.

(57) ABSTRACT

A battery pack includes a plurality of battery cells arranged such that main surfaces thereof face each other and a partition wall between adjacent battery cells. The partition wall includes at least one air pocket having a concave shape in a direction away from the main surface of one battery cell of the adjacent battery cells in a thickness direction of the partition wall.

20 Claims, 10 Drawing Sheets

BATTERY PACK WITH SEALED AIR GAP BETWEEN CELLS

CROSS-REFERENCE TO RELATED APPLICATION

Korean Patent Application No. 10-2018-0086762, filed on Jul. 25, 2018, in the Korean Intellectual Property Office, and entitled: "Battery Pack," is incorporated by reference herein in its entirety.

BACKGROUND

1. Field

Embodiments relate to a battery pack.

2. Description of the Related Art

In general, secondary batteries are rechargeable, unlike primary batteries. Secondary batteries may be used as energy sources for mobile devices, electric vehicles, hybrid vehicles, electric bicycles, uninterruptible power supplies, or the like, and depending on the types of external devices to which they are applied, the secondary batteries may be used in the form of a single battery cell or in the form of a battery pack in which a plurality of battery cells are combined into one unit.

A small mobile device such as a mobile phone may operate for a certain time according to the output and capacity of a single battery; however, in the case of long-time driving or high-power driving such as in the case of an electric vehicle or a hybrid vehicle with high power consumption, a battery pack may be preferred due to output and capacity issues. A battery pack may increase the output voltage or the output current according to the number of built-in battery cells.

SUMMARY

Embodiments are directed to a battery pack including a plurality of battery cells arranged such that main surfaces thereof face each other and including a partition wall between adjacent battery cells. The partition wall includes at least one air pocket having a concave shape in a direction away from the main surface of one battery cell of the adjacent battery cells in a thickness direction of the partition wall.

The at least one air pocket may have a closed form that, together with the main surface of the battery cell, hermetically accommodates an air layer having a volume corresponding to the at least one air pocket.

The at least one air pocket may include pairs of air pockets at symmetrical positions facing each other in the thickness direction of the partition wall with the partition wall therebetween. A pair of air pockets may be between both ones of adjacent battery cells with the partition wall therebetween.

The pair of air pockets may be isolated from each other by the partition wall and may not be connected to each other.

The at least one air pocket may include a first wall spaced apart from the main surface of the battery cell and a second wall protruding from the first wall toward the main surface of the battery cell and contacting the main surface of the battery cell.

The first and second walls of the at least one air pocket and the main surface of the battery cell may form a closed space to be isolated from outside.

The partition wall may include a thin wall portion having a relatively small thickness to be spaced apart from the main surface of the battery cell and a thick wall portion having a relatively large thickness to contact the main surface of the battery cell.

The thin wall portion and the thick wall portion may be formed at alternate positions in one direction across the partition wall.

The first wall of the at least one air pocket may be provided by the thin wall portion of the partition wall. The second wall of the at least one air pocket may be provided by the thick wall portion of the partition wall.

The at least one air pocket may include a plurality of air pockets along a wall surface of the partition wall. The plurality of air pockets may be in an isolated form such that different air pockets are not connected to each other.

The at least one air pocket may include a plurality of air pockets in a matrix form including a plurality of rows and columns along a wall surface of the partition wall.

The at least one air pocket may include a plurality of air pockets repeated regularly in pattern units of certain shapes along a wall surface of the partition wall.

The pattern units may have an isolated form such that different pattern units are not connected to each other.

The plurality of air pockets may be in a matrix form including a plurality of rows and columns in pattern units of circular dots.

A diameter of the at least one air pocket may be greater than a distance between adjacent air pockets.

The partition wall may include a main region having a plurality of air pockets arranged therein and a border region surrounding the main region, the border region having no air pocket therein.

The border region may include a sealing portion surrounding the main region and sealing the main region.

The sealing portion may contact main surfaces of adjacent battery cells facing each other.

The sealing portion may be in a form of a closed-loop that entirely surrounds the main region.

The battery cell may include a terminal surface where an electrode terminal is formed, a bottom surface opposite to the terminal surface, and a side surface connecting the terminal surface to the bottom surface and having a relatively smaller area than the main surface. The battery pack may further include a first flange portion protruding from the partition wall toward the battery cell to cover the terminal surface, a second flange portion protruding from the partition wall toward the battery cell to cover the bottom surface, and a third flange portion protruding from the partition wall toward the battery cell to cover the side surface.

The sealing portion may entirely surround the main region between the main region and the first to third flange portions.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

Figure 1:
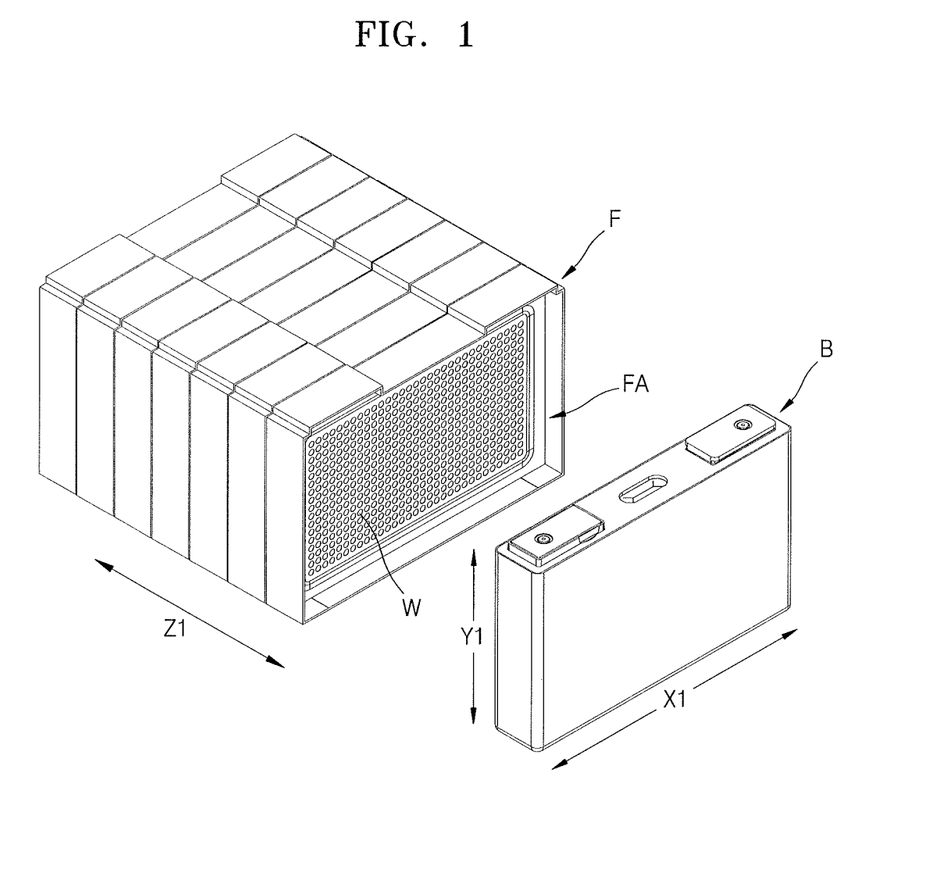
FIG. 1 illustrates an exploded perspective view of a battery pack according to an embodiment.
Figure 2:
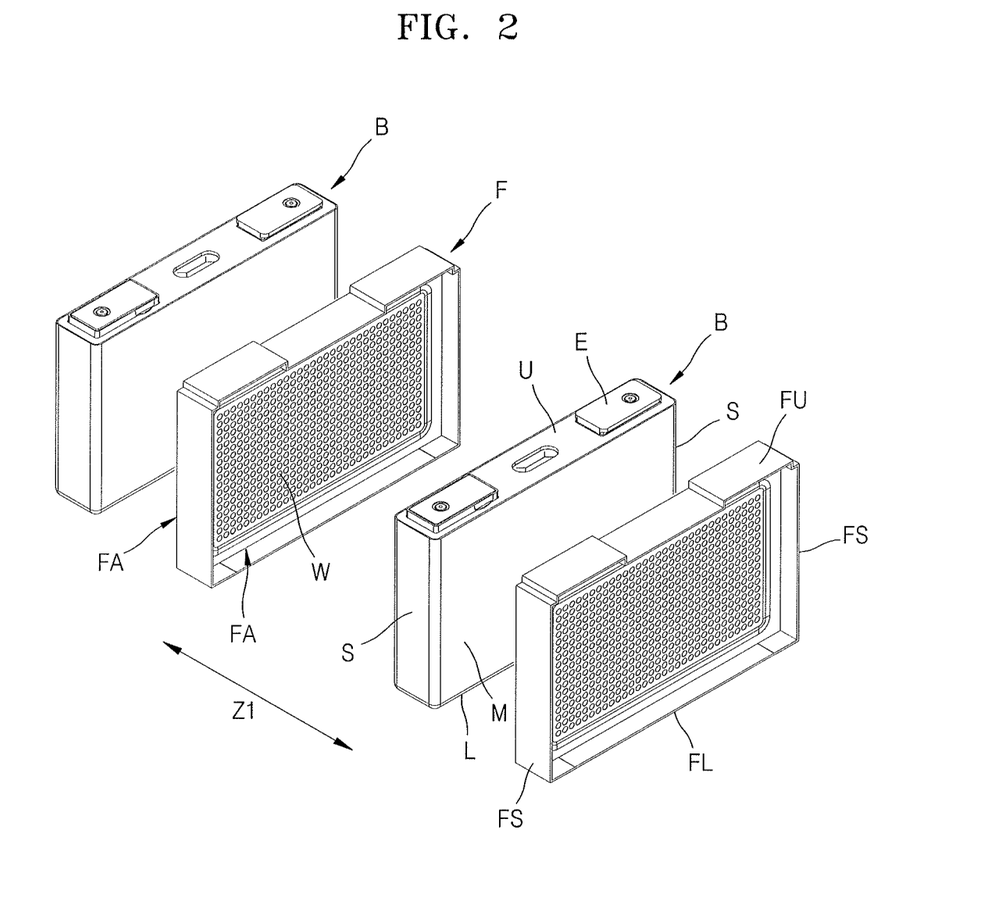
FIG. 2 illustrates an exploded perspective view of a portion of the battery pack shown in FIG. 1.
Figure 3:
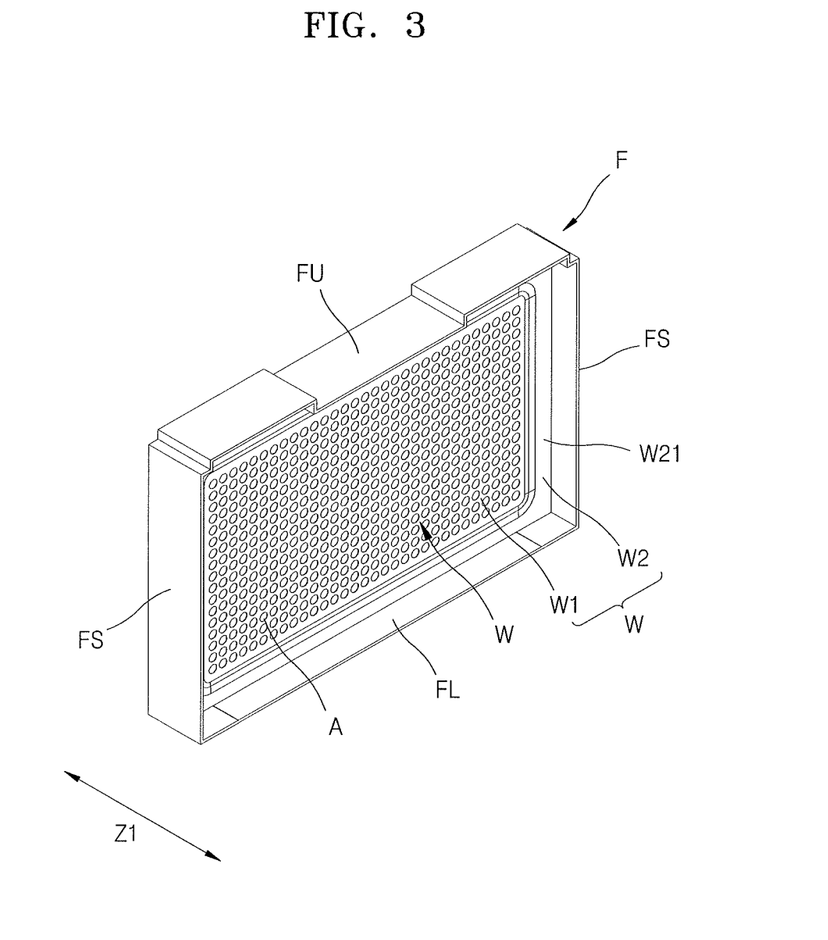
FIG. 3 illustrates a perspective view of a frame shown in FIG. 1.

FIG. 1 illustrates an exploded perspective view of a battery pack according to an embodiment. FIG. 2 illustrates an exploded perspective view of a portion of the battery pack shown in FIG. 1. FIG. 3 illustrates a perspective view of a frame shown in FIG. 1.

Referring to the drawings together, a battery pack may include a plurality of battery cells B arranged in a first direction (Z1 direction) and a plurality of frames F arranged in the first direction (Z1 direction) together with the battery cells B, the frames F being located between the battery cells B. For example, the frames F may be arranged in one direction (Z1 direction), wherein adjacent frames F may be coupled to face each other with the battery cell B between the adjacent frames F.

The frame F may be located between adjacent battery cells B to block electrical interference and thermal interference between the adjacent battery cells B. For example, the frame F may include accommodation portions FA for accommodating different battery cells B on both sides of a partition wall W between adjacent battery cells B. For example, the frame F may define an accommodation portion FA that surrounds the outskirt of the battery cell B to accommodate the battery cell B and accommodates the battery cell B while extending along the outline of battery cell B.

For example, the frame F may include a partition wall W between adjacent battery cells B in first direction (Z1 direction) to block electrical interference and thermal interference between the adjacent battery cells B and flange portions FU, FL, and FS (see FIG. 2) protruding from the partition wall W toward the battery cell B along the first direction, intersecting with the top, bottom, left, and right sides of the battery cell B, and extending along the outline of the battery cell B.

The battery cell B may include a terminal surface U that extends along a second direction (X1 direction) where an electrode terminal E is formed, a bottom surface L opposite to the terminal surface U along a third direction (Y1 direction), a pair of main surfaces M having a relatively large area in the second and third directions connecting the terminal surface U to the bottom surface L, and a pair of side surfaces S having a relatively small area and extending along the third direction (Y1 direction) connecting the terminal surface U to the bottom surface L. The battery cell B may be formed in a substantially rectangular parallelepiped shape including a terminal surface U, a bottom surface L, a pair of main surfaces M, and a pair of side surfaces S. The term "main surface M" indicates a surface occupying the largest area among the external surfaces of the battery cell B. When a plurality of battery cells B are arranged in first direction (Z1 direction), the main surfaces M of adjacent battery cells B may be arranged to face each other along the first direction. In this case, the partition wall W of the frame F may be located between the main surfaces M of adjacent battery cells B, and the flange portions FU, FL, and FS (see FIG. 2) of the frame F may protrude from the partition wall W along the first direction and cover the outer circumference of the adjacent battery cells B, for example, overlapping the peripheral surfaces of the battery cells M other than the main surface M. For example, the flange portions FU, FL, and FS may include a first flange portion FU protruding from the partition wall W toward the battery cell B along the first direction and extending along the second direction X1 to cover the terminal surface U of the battery cell B, a second flange portion FL protruding from the partition wall W toward the battery cell B along the first direction and extending along the second direction X1 to cover the bottom surface L of the battery cell B, and a third flange portion FS protruding from the partition wall W toward the battery cell B in the first direction and extending in the third direction Y1 to cover the side surface S of the battery cell B.

Figure 4:
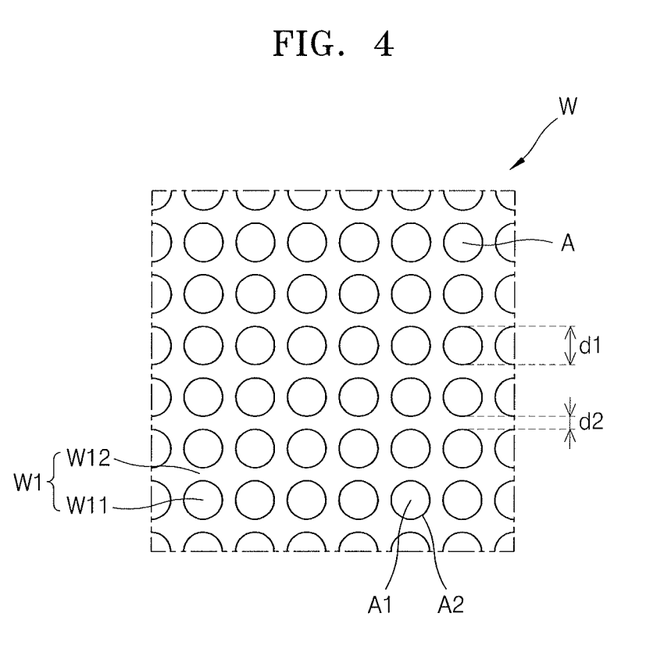
FIG. 4 illustrates a plan view of a portion of the frame shown in FIG. 3.
Figure 5:
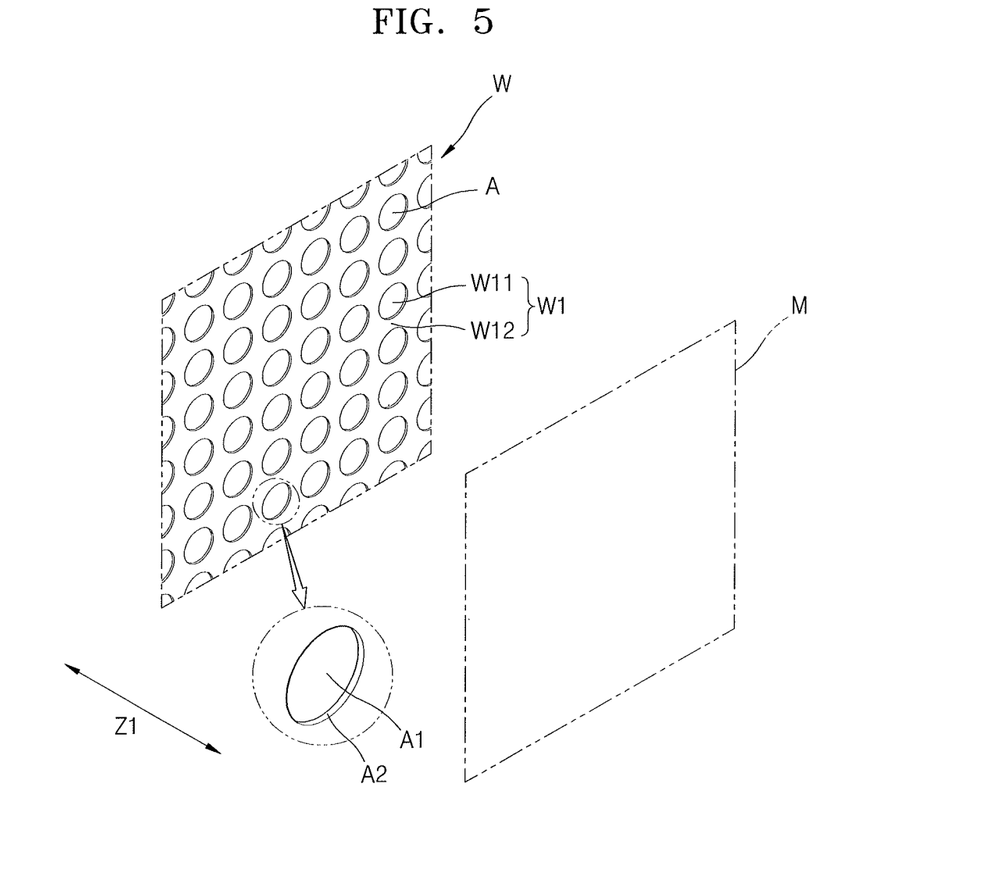
FIG. 5 illustrates an enlarged perspective view of a portion of the frame shown in FIG. 3.
Figure 6:
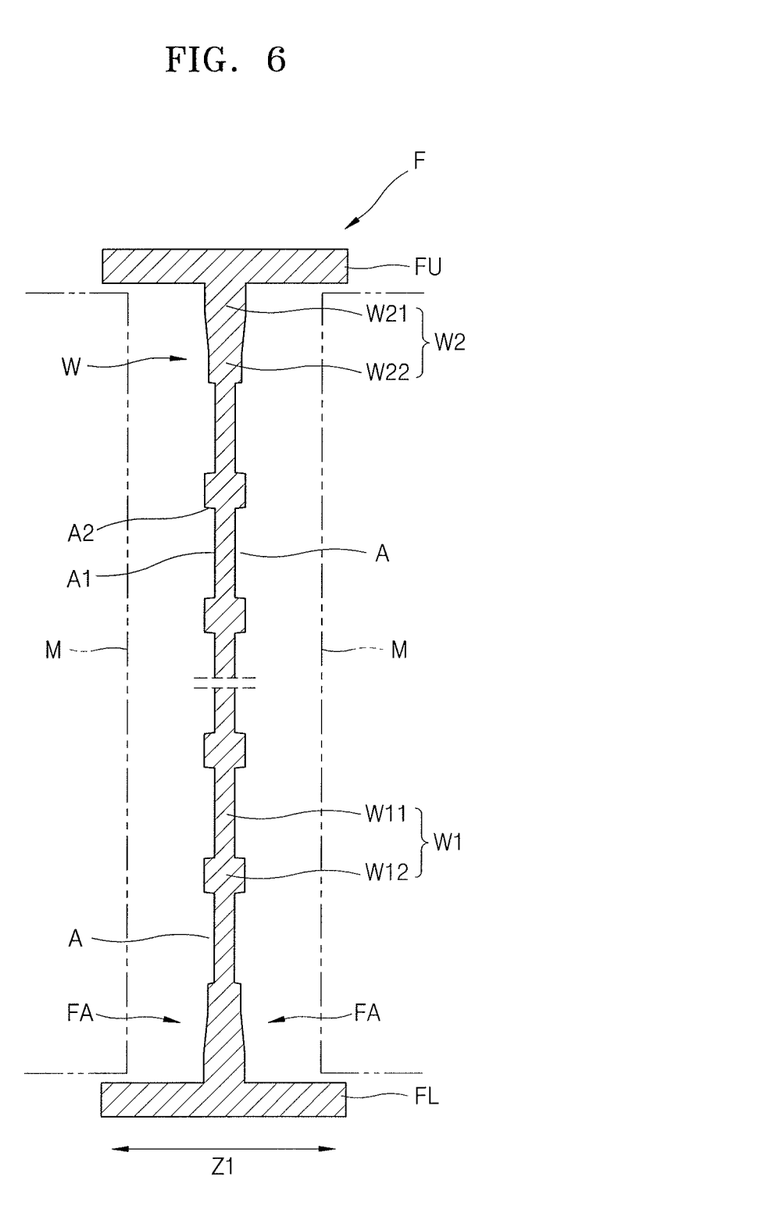
FIG. 6 illustrates a cross-sectional view of the frame shown in FIG. 3.
Figure 7:
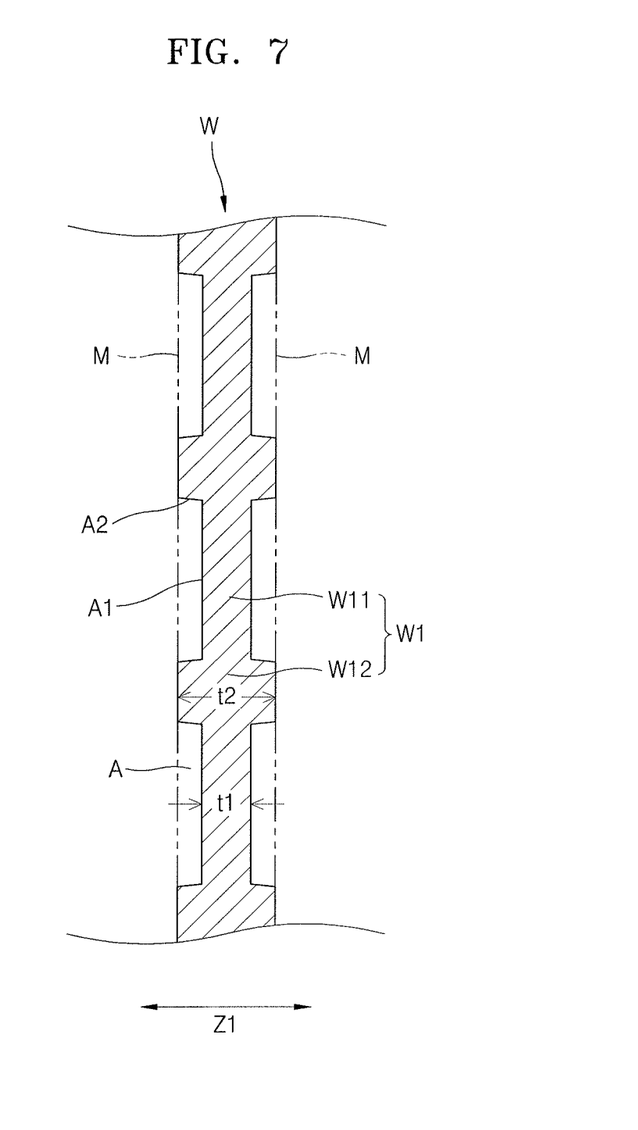
FIG. 7 illustrates a cross-sectional view of a portion of the frame shown in FIG. 6.

FIG. 4 illustrates a plan view of a portion of the frame shown in FIG. 3. FIG. 5 illustrates an enlarged perspective view of a portion of the frame shown in FIG. 3. FIG. 6 illustrates a cross-sectional view of the frame shown in FIG. 3. FIG. 7 illustrates a cross-sectional view of a portion of the frame shown in FIG. 6.

Referring to FIG. 5, at least one air pocket A that is concave relative to the battery cell B in the thickness or first direction (Z1 direction) of the partition wall W may be formed in the partition wall W. The air pocket A may be formed by a suitable method. For example, the air pocket A may be formed by engraving the partition wall W. The air pocket A may form an air layer in a static state that does not substantially flow and is hermetically confined in a static state. For example, the air pocket A, together with the main surface M of the battery cell B, may hermetically accommodate an air layer of a volume corresponding to the air pocket A.

The description that the air pocket A is concave indicates that the air pocket A has a relatively smaller thickness away from the main surface M of the battery cell B in the thickness direction (Z1 direction) of the partition wall W, thereby forming an empty space between the partition wall W and the main surface M of the battery cell B. The air pocket A may be a concave to hermetically accommodate an air layer in the air pocket A.

For example, unlike the air pocket A, a shape protruding convexly from the wall surface of the partition wall W toward the main surface M of the battery cell B may provide a certain space between the wall surface of the partition wall W and the main surface M of the battery cell B and may form an air layer between the wall surface of the partition wall W and the main surface M of the battery cell B, but may not hermetically accommodate the air layer. For example, between the wall surface of the partition wall W and the main surface M of the battery cell B, the embossed shape protruding convexly from the wall surface of the partition wall W toward the main surface M of the battery cell B may not isolate the air layer from the outside and may not hermetically accommodate the air layer.

On the other hand, an air pocket A of having a shape that is concave from the wall surface of the partition wall W in a direction away from the main surface M of the battery cell B in the thickness direction (Z1 direction) of the partition wall W may hermetically accommodate the air layer while surrounding the air layer of a volume corresponding to the air pocket A together with the main surface M of the battery cell B and may isolate the air layer from the outside. In this case, the air pocket A may be concave in a direction away from the main surface M of the battery cell B in the thickness direction (Z1 direction) of the partition wall W.

The air pocket A may have a concave shape to surround the air layer therein. For example, the air pocket A may define one space together with the main surface M of the battery cell B and may define one space closed to be isolated from the outside. In an embodiment, the air pocket A may be formed in plurality along the wall surface of the partition wall W, for example, along the second and third directions. Each air pocket A may define one space and define a closed space to be isolated from the outside. The closed space defined by the air pocket A may form a space that is substantially isolated from the outside without connection with the outside. Thus, the air layer surrounded by the air pocket A may not substantially flow in from the outside of the air pocket A or flow out to the outside of the air pocket A and may be confined in a static state by the air pocket A. For example, the air layer surrounded by the air pocket A may be maintained in a static state where the average flow rate thereof is substantially close to zero and even when the air layer of the air pocket A has air flow by thermal imbalance, the movement thereof may be restricted by being surrounded by the narrow size of the air pocket. The air pocket A may be in a static state where the average flow rate is substantially close to zero and may have a random movement. For example, the air pocket A may not form air flow of a certain pattern.

The air pocket A may be formed to have a sufficiently narrow size to restrict the flow of the air layer confined by the air pocket A. The air pocket of a narrow size, for example, along all three directions X1, Y1, and Z1, may be formed in plurality along the wall surface of the partition wall W. As such, by forming the air pocket A of a narrow size in plurality, thermal interference between both battery cells B facing each other with the partition wall W therebetween may be suppressed.

If there were no restriction on the size of the air pocket A, that is, if the air pocket A were to be formed with an excessive size, a convective heat transfer may be promoted because air flow such as natural convection is formed in the air pocket A due to thermal imbalance. Accordingly, thermal flow may be enhanced between adjacent battery cells B and thus, insulation may not be performed between the adjacent battery cells B. Instead, a heat transfer may be performed therebetween.

In contrast, by forming a plurality of air pockets A partitioned in a narrow size between both adjacent battery cells B with the partition wall W therebetween, according to embodiments, the air layer of the air pocket A may be confined in a substantially static state, e.g, in a static state where the average flow rate is close to zero, insulation may be performed between the adjacent battery cells B, and thermal interference may be blocked between the adjacent battery cells B.

The air pocket A may be formed in plurality along the wall surface of the partition wall W. For example, the air pockets A may be formed in a regular pattern along the wall surface of the partition wall W. As an example, the air pockets A may be arranged in a matrix form with a plurality of rows and columns along the wall surface of the partition wall W. In an embodiment, the air pockets A may be formed in a dot pattern arranged in a matrix form. For example, the air pockets A may be arranged in a matrix form with a plurality of rows and columns along the wall surface of the partition wall W, in a pattern unit of a circular dot.

The air pocket A may be formed in plurality along the wall surface of the partition wall W. The plurality of air pockets A may be densely arranged along the wall surface of the partition wall W. The air pockets A may be formed in an isolated form not connected to each other. For example, the air pockets A may be separated from each other along the second and third directions X1 and Y1, and without fluid connection being formed between adjacent air pockets A. Each air pocket A may hermetically accommodate an air layer of a volume corresponding to each air pocket A and isolate the air layer from the outside. Accordingly, each air pocket A may have an isolated shape of a closed form and fluid connection may not be formed between adjacent air pockets A.

For example, when a plurality of air pockets A are formed in a dot pattern along the wall surface of the partition wall W, a unit dot forming each air pocket A may have an isolated shape of a closed form. In another embodiment, a plurality of air pockets A may be formed in various patterns other than a circular dot pattern along the wall surface of the partition wall W, as long as the shape of a pattern unit forming the unit of a pattern may have an isolated shape of a closed form. For example, in another embodiment, the pattern unit may have a round shape, e.g., an elliptical shape other than a circular shape, or may have an angular shape, e.g., a square shape. In an embodiment, when the wall surface of the partition wall W and the main surface M of the battery cell B closely contact each other, the air pocket A formed in a circular dot pattern may prevent physical damage to the main surface M of the battery cell B, unlike an angular shape, and may also confine the air layer of the air pocket A in a static state without the need to consider directionality because the air pocket A does not have directionality in a particular direction, that is, a major-axis direction or a minor-axis direction, like an elliptical shape.

For example, the air pocket A formed in a circular dot pattern along the wall surface of the partition wall W may be formed in a cylindrical shape or a spherical dome shape in the thickness direction (Z1 direction) of the partition wall W, according to a particular design. In an embodiment illustrated in FIG. 5, the air pocket A may be formed in a cylindrical shape and may confine the air layer in a cylindrical shape.

The air pocket A may be formed in a concave shape to hermetically accommodate an air layer of a volume corresponding to the air pocket A, together with the main surface M of the battery cell B. For example, each air pocket A may include a first wall A1 spaced apart from the main surface M of the battery cell B and a second wall A2 protruding from the first wall A1 toward the battery cell B. Each air pocket A may accommodate an air layer corresponding to a volume defined by the first and second walls A1 and A2 of the air pocket A and the main surface M of the battery cell B.

In an embodiment, the first wall A1 may be formed in a circular shape according to a circular dot pattern, and the second wall A2 may protrude from the first wall A1 toward the main surface M of the battery cell B in the thickness direction (Z1 direction) of the partition wall W. Accordingly, the air pocket A defined by the first and second walls A1 and A2 may contact the main surface M of the battery cell B, form a closed space of a cylindrical shape, and accommodate an air layer of a cylindrical shape.

Referring to FIG. 7, the partition wall W may include a thin wall portion W11 and a thick wall portion W12 that have different thicknesses t1 and t2, respectively. In this case, the first wall A1, e.g., a back wall, of the air pocket A may be provided by the thin wall portion W11 and the second wall A2, e.g., sidewalls of the air pocket A may be provided by the thick wall portion W12. As such, the first and second walls A1 and A2 of the air pocket A may be provided through the thin wall portion W11 and the thick wall portion W12 having different thicknesses t1 and t2, and the first and second walls A1 and A2 may hermetically accommodate the air layer therein together with the main surface M of the battery cell B.

For example, the thin wall portion W11 may be formed to a relatively small thickness t1 to be spaced apart from the main surface M of the battery cell B and may provide the first wall A1 of the air pocket A spaced apart from the first wall A1. The thick wall portion W12 may be formed to a relatively large thickness t2 to contact the main surface M of the battery cell B and provide the second wall A2 of the air pocket A contacting the main surface M of the battery cell B.

The second wall A2 of the air pocket A may extend from the first wall A1 toward the main surface M of the battery cell B and may contact the main surface M of the battery cell B. The air pocket A may isolate the air layer from the outside by the second wall A2 extending from the first wall A1 toward the battery cell B and contacting the main surface M of the battery cell B. As such, by isolating the air layer by the first and second walls A1 and A2 of the air pocket A and the main surface M of the battery cell B, the air layer in a static state that does not substantially flow may be formed. By forming the air layer in a static state where the average flow rate is close to zero, a heat transfer caused by natural convection accompanying air flow may be maximally suppressed. If the air layer accommodated in the air pocket A were to flow in from the outside or flow out to the outside to form an air flow, a heat transfer would occur with the air flow. Accordingly, the insulation effect between both adjacent battery cells B with the air pocket A therebetween could be reduced accordingly.

The air pocket A may be formed in pairs at symmetrical positions facing each other with the partition wall W therebetween in the thickness direction (Z1 direction) of the partition wall W. In this case, a pair of air pockets A facing each other may be isolated from each other by the partition wall W and may not be connected to each other. If a pair of air pockets A facing each other were to be directly connected to each other, adjacent battery cells B may be directly connected to each other through the pair of air pockets A connected to each other, and electrical insulation may not be secured between the adjacent battery cells B. The partition wall W according to embodiments may provide the electrical insulation between the battery cells B adjacent to each other with the partition wall W therebetween. The partition wall W may also be located between the pair of air pockets A facing each other to maintain the insulation function of the partition wall W between the pair of air pockets A facing each other, so that the pair of air pockets A facing each other may not be directly connected to each other.

As such, the air pocket A may be formed in pairs at symmetrical positions facing each other with the partition wall W therebetween. A pair of air pockets A may be located between both battery cells B adjacent to each other with the partition wall W therebetween. In other words, the air pocket A may be formed for each of both accommodation portions FA for accommodating each of both battery cells B adjacent to each other with the partition wall W therebetween. A pair of air pockets A formed in the respective accommodation portions FA may be located between both adjacent battery cells B.

The partition wall W may include a thin wall portion W11 and a thick wall portion W12 that have different thicknesses t1 and t2. In this case, a pair of air pockets A respectively facing adjacent battery cells B may be formed at the position of the thin wall portion W11, and the thick wall portion W12 at a position adjacent to the thin wall portion W11 may surround the outer circumference of the air pocket A and confine the air layer thereof.

The thin wall portion W11 and the thick wall portion W12 of the partition wall W may be formed at adjacent positions, and the thin wall portion W11 and the thick wall portion W12 may be formed at alternate positions in one direction intersecting with the partition wall W. For example, the partition wall W may be formed in a substantially rectangular shape including a pair of long sides and a pair of short sides, and in this case, the thin wall portion W11 and the thick wall portion W12 may be formed at alternate positions in the long-side direction of the partition wall W and the thin wall portion W11 and the thick wall portion W12 may be formed at alternate positions in the short-side direction of the partition wall W. As such, when the thin wall portion W11 and the thick wall portion W12 are formed at alternate positions, the air pocket A may be located at the position of the thin wall portion W11 spaced apart from the main surface M of the battery cell B and the air pocket A of a closed form may be formed at the position of the thick wall portion W12 adjacent to the thin wall portion W11 while contacting the main surface M of the battery cell B.

Referring to FIG. 4, the air pocket A may be formed in a narrow size to suppress natural convection and may be formed in plurality along the wall surface of the partition wall W. As such, when a plurality of air pockets A partitioned in a narrow size between adjacent battery cells B are formed densely, a heat transfer caused by natural convection between the adjacent battery cells B may be suppressed. For example, the maximum dimension of each air pocket A, e.g., a diameter d1 of one circular dot constituting a pattern unit among the dot patterns forming the air pocket A, may be greater than the distance between adjacent air pockets A, for example, a distance d2 between the adjacent air pockets A. For example, by arranging adjacent air pockets A closely and densely, the insulation effect between adjacent battery cells B may be further enhanced. For example, the thick wall portion W12 of the partition wall W corresponding to the distance d2 between the adjacent air pockets A may surface-contact the adjacent battery cells B between the adjacent battery cells B to cause heat conduction between the adjacent battery cells B. Accordingly, The diameter d1 of the air pocket A may be greater than the distance d2 between the adjacent air pockets A.

According to the present disclosure, even when the thick wall portion W12 of the partition wall W corresponding to the distance d2 between the adjacent air pockets A causes heat conduction between the battery cells B, this may be subordinate to the purpose of forming the air pocket A in a closed shape to hermetically accommodate the air layer. Thus, the thick wall portion W12 to contact the main surface M of the battery cell B. Even when heat conduction is inevitably involved through the thick wall portion W12 contacting the main surface M of the partition wall W, the heat conduction effect of the thick wall portion W12 may be controlled below a proper level in comparison with the insulation effect of the air pocket A by forming the diameter d1 of the air pocket A to be greater than the distance d2 between the adjacent air pockets A.

In an embodiment, the air pocket A may be formed in a circular dot shape. The distance d2 between the adjacent air pockets A may be measured differently along the outer circumference of the air pocket A. In an embodiment, the minimum distance between the adjacent air pockets A, that is, the distance d2 between the curved portions of the adjacent air pockets A, may be less than the diameter d1 of the air pocket A, and even the maximum distance between the adjacent air pockets A may be less than the diameter d1 of the air pocket A.

In an embodiment illustrated in FIG. 7, when the thick wall portion W12 of the partition wall W surface-contacts the main surfaces M of both battery cells B facing each other with the partition wall W therebetween, the position of the partition wall W may be stably maintained between both battery cells B.

Figure 8:
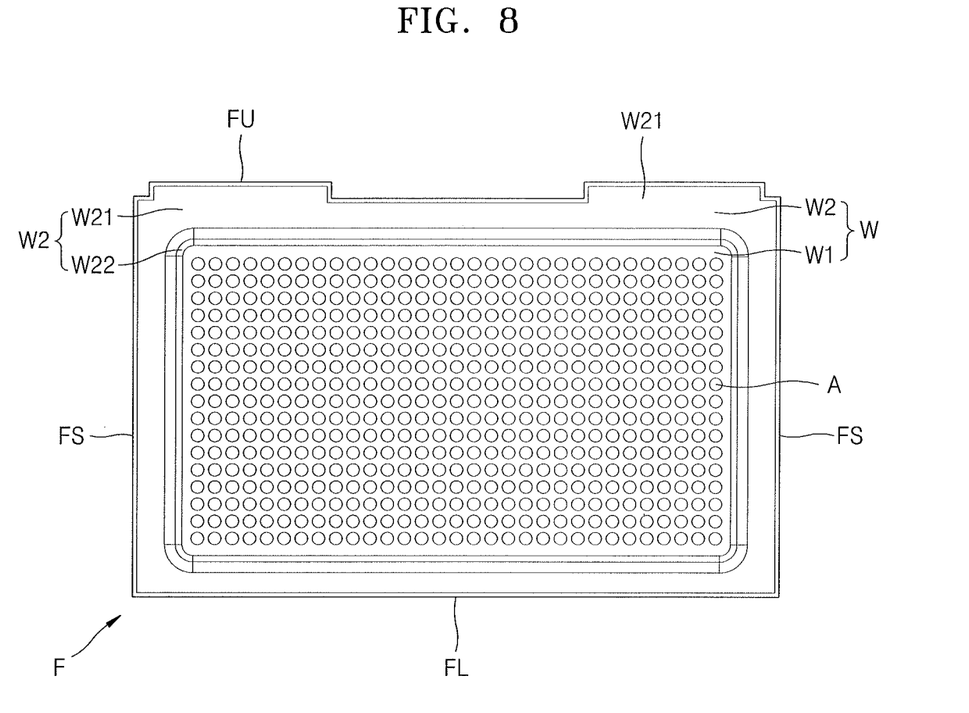
FIG. 8 illustrates a plan view of the frame shown in FIG. 3.
Figure 9:
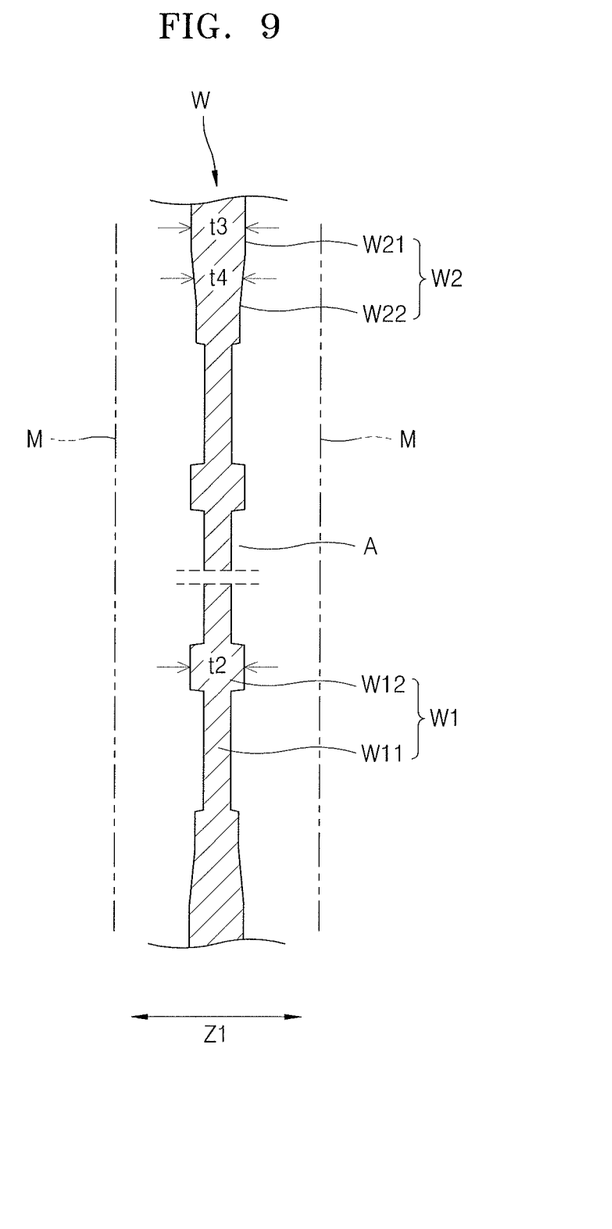
FIG. 9 illustrates a cross-sectional view of a portion of the frame shown in FIG. 3.

FIG. 8 is a plan view of the frame illustrated in FIG. 3. FIG. 9 is a cross-sectional view of a portion of the frame illustrated in FIG. 3.

Referring to FIG. 8, the partition wall W may include a main region W1 in which a plurality of air pockets A are densely located and a border region W2 surrounding the main region W1. An air pocket A may not be formed in the border region W2. The main region W1 of the partition wall W may correspond to a central region of the battery cell B, and the border region W2 of the partition wall W may correspond to a position close to the terminal surface U, the bottom surface L, and the side surface S of the battery cell B, i.e., an edge region close to the outside of the battery cell B. Because heat accumulation occurs more easily in the central region of the battery cell B than in the border region relatively close to the outside of the battery cell B, a plurality of air pockets A may be in the main region W1 of the partition wall W corresponding to the central region of the battery cell B in order to block the thermal runway from some locally-degraded battery cells B to adjacent battery cells B due to the heat accumulation. Also, because the central region of the battery cell B may be curvedly expanded due to swelling and thus the central regions of adjacent battery cells B may be deformed in a direction approaching each other, a plurality of air pockets A may be in the main region W1 of the partition wall W corresponding to the central region of the battery cells B to provide insulation between the adjacent battery cells B. Because providing insulation between the adjacent battery cells B is relatively small in the border region W2, unlike in the main region W1 of the partition wall W, an air pocket A may omitted from the border region W2 of the partition wall W. For example, even when an air pocket A is formed in the border region W2 of the partition wall W, when the central region of the battery cell B is curvedly expanded due to swelling, the air pocket A formed in the border region W2 of the partition wall W may be separated from the main surface M of the battery cell B to lose a function of the air pocket A. An air pocket A may be omitted in the border region W2 of the partition wall W for convenience of manufacturing.

Referring to FIG. 9, a sealing portion W21 for sealing the main region W1 of the center may be formed in the border region W2. The sealing portion W21 may be formed to be relatively thick to closely contact the main surfaces M of adjacent battery cells B in the thickness direction (Z1 direction) of the partition wall W. In an embodiment, a thickness t3 of the sealing portion W21 formed in the border region W2 may be equal to the thickness t2 of the thick wall portion W12 formed in the main region W1. When the thickness t3 of the sealing portion W21 of the border region W2 is equal to the thickness t2 of the thick wall portion W12 of the main region W1, the main surfaces M of both battery cells B adjacent to each other with the partition wall W therebetween may contact the sealing portion W21 in the border region W2 of the partition wall W and contact the thick wall portion W12 in the main region W1 of the partition wall W. In the air pocket A formed in the main region W1, an air layer may be hermetically accommodated in the air pocket A by the thick wall portion W12. The air layer hermetically accommodated in the air pocket A may be fluidly isolated from the external air of the partition wall W by the sealing portion W21 of the border region W2. As such, due to the thick wall portion W12 of the main region W1 and the sealing portion W21 of the border portion W2, the air layer in the air pocket A may be doubly hermetically accommodated and may be doubly isolated from the outside of the partition wall W to provide insulation between both battery cells B adjacent to each other with the partition wall W therebetween in a static state where air flow is not substantially formed.

The sealing portion W21 may contact the main surfaces M of adjacent battery cell B in the thickness direction (Z1 direction) of the partition wall W at symmetrical positions of the partition wall W and may closely contact the main surfaces M of both adjacent battery cells B. The sealing portion W21 may closely contact both battery cells B facing each other with the partition wall W therebetween, thereby isolating the main region W1 of the partition wall W from the outside of the partition wall W while sealing the main region W1 of the partition wall W. Here, the description that the sealing portion W21 seals the main region W1 or isolates the main region W1 from the outside of the partition wall W may indicate that the fluid connection is blocked between the main region W1 and the outside of the partition wall W and that fluid flow, such as penetration of the external air into the main region W1 in which a plurality of air pockets A are formed or outflow of the air layer hermetically accommodated by a plurality of air pockets A to the external air is blocked, thereby blocking the fluid connection between the outside of the partition wall W and the main region W1 in which a plurality of air pockets A are formed.

The sealing portion W21 may surround the main region W1 in which a plurality of air pockets A are densely arranged. The sealing portion W21 may isolate a group of air pockets A arranged in the main region W1 from the outside of the partition wall W. By isolating a group of air pockets A from the outside of the partition wall W, the sealing portion W21 may block the air flow between the outside of the partition wall W and the main region W1 and block the fluid connection between the outside of the partition wall W and the main region W1. Heat transfer caused by natural convection according to the air flow connected to the main region W1, such as the inflow of air from the outside of the partition wall W or the outflow of air to the outside of the partition wall W may be reduced or prevented.

By isolating the main region W1 in which a group of air pockets A are arranged from the outside of the partition wall W, the sealing portion W21 may prevent the inflow of air from the outside to the main region W1 or the outflow of air from the main region W1 to the outside and may form an air layer in a static state where air flow is not substantially formed in the main region W1.

Referring to FIG. 9, the border region W2 of the partition wall W may include a sealing portion W21 formed to be relatively thick in the thickness or first direction (Z1 direction) of the partition wall W, for example, slightly thicker than the thick wall portion W12 to closely contact the main surface M of the battery cell B and an extension portion W22 formed to be relatively thinner than the sealing portion W21 in the thickness or first direction (Z1 direction) of the partition wall W to be spaced apart from the main surface M of the battery cell B. The extension portion W22 may connect the sealing portion W21 of the border region W2 to the air pocket A of the main region W1, may form a variable thickness t4 while extending in the thickness direction (Z1 direction) of the partition wall W obliquely from the sealing portion W21 contacting the main surface M of the battery cell B. The extension portion W22 may help to prevent damage to the main surface M of the battery cell B.

Referring to FIG. 8, the sealing portion W21 may entirely surround the main region W1. The main region W1 may be surrounded by the sealing portion W21 and may not be exposed from the sealing portion W21. For example, the sealing portion W21 may be formed in a closed form or a closed-loop form in the second and third direction X1 and Y1 to entirely surround the main region W1 and may not be formed in an open-loop form where a certain portion is open.

The sealing portion W21 may surround the main region W1 between the main region W1 and the first to third flange portions FU, FL, and FS to seal the main region W1. More particularly, the frame F including the partition wall W may include a first-flange portion FU protruding from the partition wall W in the first direction Z1 and extending along the second direction X1 to cover the terminal surface U of the battery cell B, a second flange portion FL protruding from the partition wall W in the first direction Z1 and extending along the second direction X1 to cover the bottom surface L of the battery cell B, and a third flange portion FS protruding from the partition wall W in the first direction Z1 and extending along the third direction Y1 to cover the side surface S of the battery cell B. The sealing portion W21 may entirely surround the main region W1 between the main region W1 and the first to third flange portions FU, FL, and FS.

Referring to FIG. 9, according to the present disclosure, an air pocket A may have a concave shape relative to the main surface M of the battery cell B in the thickness direction (Z1 direction) of the partition wall W. A sealing portion W21 may be formed to closely contact the main surface M of the battery cell B in the thickness direction (Z1 direction) of the partition wall W while surrounding the main region W1 in which the air pocket A is formed, thereby minimizing the thermal interference between both adjacent battery cells B with the partition wall W therebetween.

Figure 10:
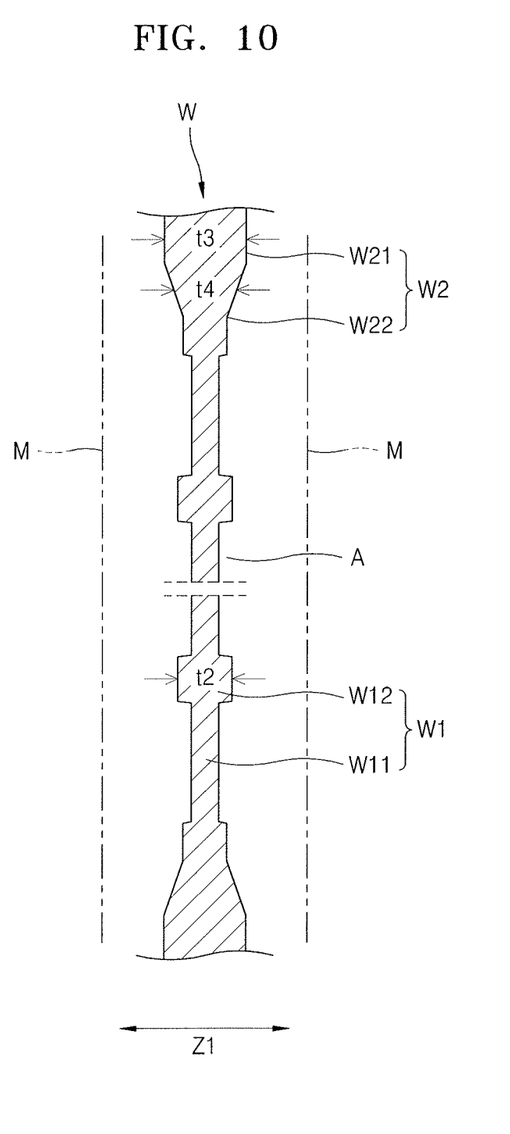
FIG. 10 illustrates a cross-sectional view illustrating a frame according to a modified embodiment of FIG. 9.

FIG. 10 is a cross-sectional view illustrating a frame according to a modified embodiment of FIG. 9. Referring to FIG. 10, a sealing portion W21 for sealing a main region W1 of the center may be formed in a border region W2. The sealing portion W21 may be formed to be relatively thick to closely contact the main surfaces M of adjacent battery cells B in the thickness direction (Z1 direction) of the partition wall W.

In an embodiment illustrated in FIG. 10, a thickness t3 of the sealing portion W21 formed in the border region W2 may be greater than the thickness t2 of the thick wall portion W12 formed in the main region W1. In an embodiment illustrated in FIG. 9, the thickness t3 of the sealing portion W21 formed in the border region W2 is equal to the thickness t2 of the thick wall portion W12 formed in the main region W1. However, in an embodiment illustrated in FIG. 10, the thickness t3 of the sealing portion W21 formed in the border region W2 may be greater than the thickness t2 of the thick wall portion W12 formed in the main region W1. In the embodiments of FIGS. 9 and 10, the thickness t3 of the sealing portion W21 of the border region W2 in the present disclosure may be at least equal to or greater than the thickness t2 of the thick wall portion W12 of the main region W1. The extension portion W22 between the portion having the thickness t2 and the thickness t3 may have a variable thickness t4 that becomes thinner between the portion having the thickness t3 and the portion having the thickness t2.

Also, in the embodiment of FIG. 10, the main surfaces M of the battery cell B adjacent to each other on both sides with the partition wall W therebetween may contact the sealing portion W21 in the border region W2 and may contact the thick wall portion W12 in the main region W1. For example, when the main surface M of the battery cell B expands in the thickness direction (Z1 direction) of the partition wall W according to the swelling of the battery cell B, the central region of the battery cell B facing the main region W1 among the main surfaces M of the battery cell B may be curvedly expanded while protruding toward the partition wall W. The border region of the battery cell B facing the border region W2 among the main surfaces M of the battery cell B may not protrude toward the partition wall W or may protrude to a relatively small extent, even when the sealing portion W21 of the border region W2 and the thick wall portion W12 of the main region W1 are formed to different thicknesses t2 and t3. The main surfaces M of the battery cell B curvedly expanded in the central region may simultaneously contact the thick wall portion W12 of the main region W1 and the sealing portion W21 of the border region W2. For example, the central region of the main surface M of the battery cell B may be curvedly expanded due to the swelling of the battery cell B to contact the thick wall portion W12 of the main region W1. The border region of the main surface M of the battery cell B may contact the sealing portion W21 of the border region W2 formed to be relatively thick, even without protruding toward the partition wall W due to the swelling of the battery cell B.

By way of summation and review, by forming a plurality of air pockets for hermetically accommodating air layers between the adjacent battery cells, effective insulation may be provided between adjacent battery cells, and thermal interference between the adjacent battery cells may be blocked. By effectively insulating the adjacent battery cells from each other, the thermal runway from some locally-degraded battery cells to other adjacent battery cells may be blocked.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising: a plurality of battery cells arranged such that main surfaces thereof face each other; and a partition wall between adjacent ones of the plurality of battery cells, wherein the partition wall includes a plurality of air pockets having a concave shape in a direction away from the main surface of one battery cell of the adjacent battery cells in a thickness direction of the partition wall,
   wherein a diameter of each of the plurality of air pockets is greater than a distance between adjacent ones of the plurality of air pockets, and
   wherein the partition wall includes: a thin wall portion overlapping the plurality of air pockets; and a thick wall portion thicker than the thin wall portion and contacting the main surface of the one battery cell, the thin and thick wall portions being solid in their entireties.

2. The battery pack as claimed in claim 1, wherein:
each of the plurality of air pockets has a closed form that, together with the main surface of the one battery cell, hermetically accommodates an air layer having a volume corresponding to the plurality of air pockets.

3. The battery pack as claimed in claim 1, wherein:
each of the plurality of air pockets includes a pair of air pockets at symmetrical positions facing each other in the thickness direction of the partition wall with the partition wall therebetween, and
the pair of air pockets are between the adjacent ones of the plurality of battery cells with the partition wall therebetween.

4. The battery pack as claimed in claim 3, wherein:
the pair of air pockets are isolated from each other by the partition wall and are not connected to each other.

5. The battery pack as claimed in claim 1, wherein:
each of the plurality of air pockets includes a first wall spaced apart from the main surface of the one battery cell and a second wall protruding from the first wall toward the main surface of the one battery cell and contacting the main surface of the one battery cell.

6. The battery pack as claimed in claim 5, wherein:
the first and second walls of each of the plurality of air pockets and the main surface of the one battery cell form a closed space to be isolated from outside.

7. The battery pack as claimed in claim 5, wherein:
the partition wall includes:
a thin wall portion having a relatively small thickness to be spaced apart from the main surface of the one battery cell; and
a thick wall portion having a relatively large thickness to contact the main surface of the one battery cell, a surface of the thick wall portion facing and contacting the main surface of the one battery cell being flat.

8. The battery pack as claimed in claim 7, wherein:
the thin wall portion and the thick wall portion are formed at alternate positions in one direction across the partition wall.

9. The battery pack as claimed in claim 7, wherein:
the first wall of each of the plurality of air pockets is provided by the thin wall portion of the partition wall, and
the second wall of each of the plurality of air pockets is provided by the thick wall portion of the partition wall.

10. The battery pack as claimed in claim 1, wherein:
the plurality of air pockets are arranged along a wall surface of the partition wall, the plurality of air pockets being in an isolated form such that different air pockets of the plurality of air pockets are not connected to each other.

11. The battery pack as claimed in claim 1, wherein:
the plurality of air pockets are arranged in a matrix form including a plurality of rows and columns along a wall surface of the partition wall.

12. The battery pack as claimed in claim 1, wherein:
the plurality of air pockets are repeated regularly in pattern units of certain shapes along a wall surface of the partition wall.

13. The battery pack as claimed in claim 12, wherein:
the pattern units have an isolated form such that different pattern units are not connected to each other.

14. The battery pack as claimed in claim 12, wherein:
the plurality of air pockets is in a matrix form including a plurality of rows and columns in pattern units of circular dots.

15. The battery pack as claimed in claim 1, wherein:
the partition wall includes:
a main region having the plurality of air pockets arranged therein; and
a border region surrounding the main region, the border region having no air pockets therein.

16. The battery pack as claimed in claim 15, wherein:
the border region includes a sealing portion surrounding the main region and sealing the main region.

17. The battery pack as claimed in claim 16, wherein:
the sealing portion contacts the main surfaces of the adjacent ones of the plurality of battery cells facing each other.

18. The battery pack as claimed in claim 16, wherein:
the sealing portion is in a form of a closed-loop that entirely surrounds the main region.

19. The battery pack as claimed in claim 16, wherein:
the one battery cell includes a terminal surface where an electrode terminal is formed, a bottom surface opposite to the terminal surface, and a side surface connecting the terminal surface to the bottom surface and having a relatively smaller area than the main surface, and
the battery pack further includes a first flange portion protruding from the partition wall toward the one battery cell to cover the terminal surface;

a second flange portion protruding from the partition wall toward the one battery cell to cover the bottom surface; and a third flange portion protruding from the partition wall toward the one battery cell to cover the side surface.

20. The battery pack as claimed in claim 19, wherein:

the sealing portion entirely surrounds the main region between the main region and the first to third flange portions.

* * * * *